(No Model.)

J. KALDRIDER.
NUT LOCK.

No. 548,556. Patented Oct. 22, 1895.

Witnesses.
Robert Emmitt.
Dennis Sumby.

Inventor.
John Kaldrider.
By James L. Norris
Atty.

UNITED STATES PATENT OFFICE.

JOHN KALDRIDER, OF HEATERS, WEST VIRGINIA.

NUT-LOCK.

SPECIFICATION forming part of Letters Patent No. 548,556, dated October 22, 1895.

Application filed February 23, 1895. Serial No. 539,443. (No model.)

*To all whom it may concern:*

Be it known that I, JOHN KALDRIDER, a citizen of the United States, residing at Heaters, in the county of Braxton and State of West Virginia, have invented new and useful Improvements in Lock-Nuts for Bolts, of which the following is a specification.

This invention has for its object to provide novel, simple, efficient, and economical means for locking a screw-nut on a screw-bolt designed for fastening fish-plates or other objects, or for other purposes for which bolts are ordinarily employed.

To accomplish this object my invention consists in the features of construction and the combination or arrangement of parts hereinafter described and claimed, reference being made to the accompanying drawings, in which—

Figure 1:
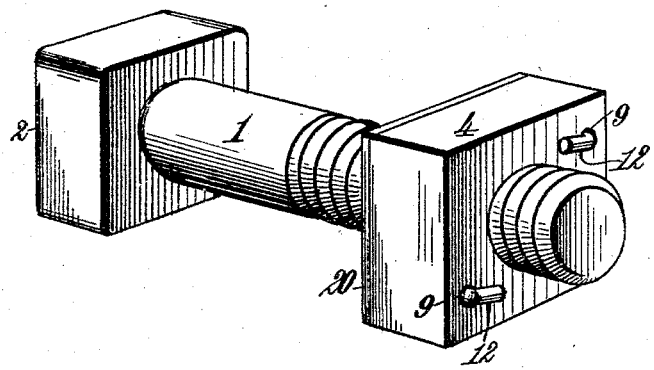
Figure 2:
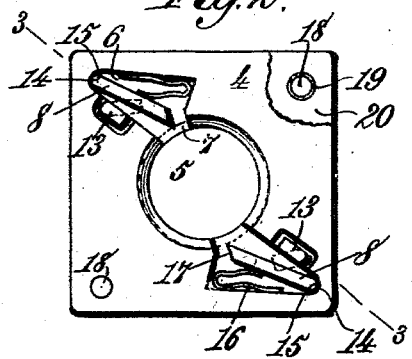
Figure 3:
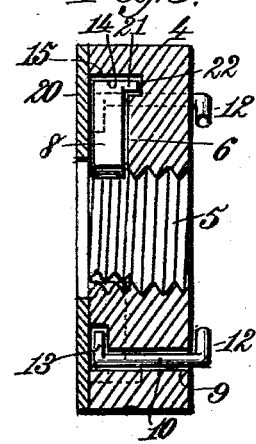

Figure 1 is a perspective view of a bolt having a nut provided with my invention. Fig. 2 is a plan view looking at the inner face of the nut, the plate which is applied to the inner face of the nut being omitted; and Fig. 3 is a sectional view taken on the line 3 3, Fig. 2.

In order to enable those skilled in the art to make and use my invention, I will now describe the same in detail, referring to the drawings, wherein—

The numeral 1 indicates a screw-threaded bolt, having at one end a head 2 of any desired form, and 4 indicates the screw-nut, having a screw-threaded orifice 5 and constructed in its inner face with two oppositely-arranged recesses 6, the walls of which are cut away at the points 7, so that the inner ends of the pawls 8 can project through and engage the thread of the bolt.

The nut is provided with two transverse cylindrical orifices 9, opening at their inner ends into the recesses 6, and through each cylindrical orifice extends an oscillatory spindle 10, having at its outer end a handle 12 and at its inner end a cam or crank 13. The handles at the outer ends of the spindles enable the latter to be turned in the cylindrical orifices for the purpose of moving the cams or cranks 13 into or out of engagement with the pawls 8. The recesses 6 are provided in one edge with semicircular bearings 14, in which are accurately fitted and articulated the semicircular bearings or edges 15 of the pawls 8, so that the pawls are thus pivoted without the employment of separate pivot-pins, which are objectionable owing to the difficulty of applying the same and the expense of constructing the parts to receive separate pivots. The recesses 6 are of such dimensions that leaf-springs 16 can be placed therein at one side of the pawls 8, while the cams or cranks 13 of the spindles 10 can oscillate or rock at the opposite sides of the pawls, all in such manner that the cams or cranks can be moved into position to release the pawls, so that the springs 16 will force the beveled ends 17 of the pawls into engagement with the thread of the bolt, while if the cams or cranks be moved in the opposite direction the pawls will be swung and locked away from the thread of the bolt and against the tension of the springs. When the spindles 10 are turned in the proper direction to cause the cams or cranks 13 to disengage or release the pawls 8, the beveled ends of the latter fly into engagement with the thread of the bolt and effectually lock the nut against rotation thereupon; but the nut can be readily adjusted or removed whenever occasion demands by turning the spindles 10 in such direction as to cause the cams or cranks 13 to force the pawls 8 in a direction away from the thread of the bolt.

The pawls 8 are retained in proper position and are prevented from moving lengthwise inwardly into the screw-threaded orifice 5 of the nut by providing the end of each pawl with a short cylindrical pin 21, arranged coincident with the semicircular bearing or edge 15 of the pawl. The cylindrical pin 21 of each pawl enters a recess, as at 22, and consequently the pawl can swing, but it cannot be accidentally displaced lengthwise. Obviously, however, the pawls can be readily removed and replaced whenever occasion demands.

The inner face of the nut is provided with studs 18 to enter stud-holes 19 in a covering-plate 20, designed to cover the inner face of the nut and thus conceal and protect the pawls and other operating devices lying within the recesses 6. The covering-plate 20 effectually excludes dust, dirt, and other foreign matter from the recesses 6, which would likely interfere with the correct working of the pawls and their actuating devices, while at the same time the recesses 6 can be formed directly in the inner face of the nut.

The invention provides a new and improved nut-lock, which is simple and economical in construction and adapted for use wherever a bolt and nut are used for securing or holding objects together.

The nut-lock is particularly designed for the bolts employed to fasten fish-plates; but obviously a bolt and nut provided with my invention can be used for any purpose for which a bolt is ordinarily employed.

What I claim is—

1. The combination with a screw-bolt, of a screw-nut having a transverse orifice, and a cavity or recess in its inner side, formed in one edge with a semi-circular socket-bearing, studs projecting from the inner face of the nut, a swinging-pawl movable in said cavity or recess, and having a beveled portion to engage the thread of the bolt, a spring arranged in said cavity or recess in one side of the pawl, an oscillatory spindle journaled in the transverse orifice of the nut, having at its outer end a handle and at its inner end a cam or crank acting against the side of the pawl opposite the spring, and a covering plate having stud-holes receiving the studs of the nut and secured thereby, substantially as described.

2. The combination with a screw-bolt, of a screw-nut having a transverse orifice 9, recess 22, and a cavity 6, formed in one edge with a semi-circular socket bearing 14, a swinging pawl having a beveled portion, a semi-circular bearing edge 15, and a pin 21 which engages the recess 22, a spring arranged in the cavity 6 at one side of the pawl, an oscillatory spindle 10 journaled in the orifice 9, having at its outer end a handle 12, and at its inner end a cam or crank 13 acting against the side of the pawl opposite the spring, and a covering plate applied to the inner face of the nut and secured thereto, substantially as described.

In testimony whereof I have hereunto set my hand in presence of two subscribing witnesses.

JOHN KALDRIDER.

Witnesses:
JOHN E. MORRIS,
S. W. MOON.